(12) United States Patent
Cao et al.

(10) Patent No.: US 11,455,511 B2
(45) Date of Patent: Sep. 27, 2022

(54) GROUND ENVIRONMENT DETECTION METHOD AND APPARATUS

(71) Applicant: HUAWEI TECHNOLOGIES CO., LTD., Guangdong (CN)

(72) Inventors: Tongtong Cao, Beijing (CN); Yunfeng Shao, Beijing (CN); Jun Yao, London (GB)

(73) Assignee: Huawei Technologies Co., Ltd., Shenzhen (CN)

(*) Notice: Subject to any disclaimer, the term of this patent is extended or adjusted under 35 U.S.C. 154(b) by 745 days.

(21) Appl. No.: 16/456,057

(22) Filed: Jun. 28, 2019

(65) Prior Publication Data
US 2019/0317218 A1    Oct. 17, 2019

Related U.S. Application Data

(63) Continuation of application No. PCT/CN2016/113089, filed on Dec. 29, 2016.

(51) Int. Cl.
*G01C 3/08* (2006.01)
*G06N 3/02* (2006.01)
(Continued)

(52) U.S. Cl.
CPC .............. *G06N 3/02* (2013.01); *G01S 17/931* (2020.01); *G06V 10/22* (2022.01)

(58) Field of Classification Search
CPC ....................................................... G01C 3/08
See application file for complete search history.

(56) References Cited

U.S. PATENT DOCUMENTS

| 4,781,465 A | * | 11/1988 | Demachi | ................ | G01S 17/88 |
| | | | | | 356/3.07 |
| 6,452,684 B1 | * | 9/2002 | Mennink | ............... | E01C 19/006 |
| | | | | | 356/3.07 |

(Continued)

FOREIGN PATENT DOCUMENTS

| CN | 101044507 A | 9/2007 |
| CN | 101536051 A | 9/2009 |

(Continued)

OTHER PUBLICATIONS

Office Action issued in Chinese Application No. 201680091952.6 dated Aug. 24, 2020, 16 pages (With English Translation).

(Continued)

*Primary Examiner* — Olisa Anwah
(74) *Attorney, Agent, or Firm* — Fish & Richardson P.C.

(57) ABSTRACT

A ground environment detection method and apparatus are disclosed, where the method includes: scanning a ground environment by using laser sounding signals having different operating wavelengths, receiving a reflected signal that is reflected back by the ground environment, determining scanning spot information of each scanning spot of the ground environment based on the reflected signal, determining space coordinate information and a laser reflection feature of each scanning spot based on each piece of scanning spot information, partitioning the ground environment into sub-regions having different laser reflection features, and determining a ground environment type of each sub-region. Lasers having different operating wavelengths are used to scan the ground, and the ground environment type is determined based on the reflection intensity of the ground environment under different wavelengths of lasers, thereby improving a perception effect of a complex ground environment, and better determining a passable road surface.

18 Claims, 4 Drawing Sheets

(51) Int. Cl.
*G01S 17/931* (2020.01)
*G06V 10/22* (2022.01)

(56) References Cited

U.S. PATENT DOCUMENTS

| | | | |
|---|---|---|---|
| 9,110,196 B2 | 8/2015 | Urmson et al. | |
| 9,128,190 B1 | 9/2015 | Ulrich et al. | |
| 10,761,195 B2* | 9/2020 | Donovan | G01S 7/497 |
| 10,832,426 B2* | 11/2020 | Aikin | G06T 7/40 |
| 2005/0189503 A1 | 9/2005 | Jamieson et al. | |
| 2008/0046150 A1* | 2/2008 | Breed | B60R 21/0134 |
| | | | 701/45 |
| 2010/0039217 A1 | 2/2010 | Borlez et al. | |
| 2010/0274539 A1 | 10/2010 | Virkar et al. | |
| 2010/0280751 A1* | 11/2010 | Breed | G08G 1/161 |
| | | | 701/414 |
| 2013/0093852 A1 | 4/2013 | Ye | |
| 2015/0375753 A1* | 12/2015 | Schräbler | G01N 21/55 |
| | | | 356/445 |
| 2016/0178802 A1* | 6/2016 | Stainvas Olshansky | |
| | | | G01N 21/49 |
| | | | 356/445 |
| 2017/0234977 A1* | 8/2017 | Kim | G01S 17/10 |
| | | | 356/5.01 |

FOREIGN PATENT DOCUMENTS

| | | |
|---|---|---|
| CN | 101806579 A | 8/2010 |
| CN | 102142892 A | 8/2011 |
| CN | 103198302 A | 7/2013 |
| CN | 103776318 A | 5/2014 |
| CN | 104408443 A | 3/2015 |
| CN | 104463217 A | 3/2015 |
| CN | 104656101 A | 5/2015 |
| CN | 104850834 A | 8/2015 |
| CN | 105094143 A | 11/2015 |
| CN | 105510897 A | 4/2016 |
| CN | 105793677 A | 7/2016 |
| EP | 1569007 A2 | 8/2005 |
| JP | 2002156452 A | 5/2002 |
| JP | 2005090974 A | 4/2005 |
| JP | 2007240314 A | 9/2007 |
| JP | 2012189535 A | 10/2012 |
| JP | 2013181968 A | 9/2013 |
| JP | 2015014514 A | 1/2015 |
| JP | 2016223795 A | 12/2016 |

OTHER PUBLICATIONS

PCT International Search Report and Written Opinion issued in Application No. PCT/CN2016/113,089 dated Aug. 18, 2017, 16 pages (With English Translation).
Office Action issued in Chinese Application No. 201680091952.6 dated Jul. 9, 2021, 7 pages (with English translation).
Extended European Search Report issued in European Application No. 16925037.0 dated Dec. 11, 2019, 8 pages.
Hardie et al., Spectral band selection and classifier design for a multispectral imaging laser radar, Optical Engineering, vol. 37, No. 3, XP000771051, Mar. 1998, pp. 752-762.
Office Action issued in Japanese Application No. 2019-535919 dated Jun. 16, 2020, 12 pages (with English translation).

* cited by examiner

GROUND ENVIRONMENT DETECTION METHOD AND APPARATUS

CROSS-REFERENCE TO RELATED APPLICATIONS

This application is a continuation of International Application No. PCT/CN2016/113089, filed on Dec. 29, 2016, the disclosure of which is hereby incorporated by reference in its entirety.

TECHNICAL FIELD

Embodiments of the present invention relate to the self-driving field, and in particular, to a ground environment detection method and apparatus.

BACKGROUND

A self-driving car, also referred to as a driverless car, is an intelligent car that implements unmanned driving by using a computer system or a terminal device. One of important preconditions for self-driving is to detect a ground environment, and a road surface condition and an area where a vehicle can pass are determined by detecting the ground environment, so as to support planning, decision-making, and control of subsequent self-driving.

In the prior art, laser radar scanning that is based on a single operating wavelength or an image recognition manner is usually used to determine a passable road surface based on space information or an image feature of the road surface. However, these manners have good effects only when the ground environment is simple (such as a smooth highway surface) or the ground environment has an obvious image feature (such as a road surface with clear lane lines), cannot correctly detect a complex road environment, such as an uneven road surface, and has a poor detection effect when there is grass or water on a road surface, there are incomplete road lines on a road, there is a shadow on a road surface, or at night.

SUMMARY

In view of the above, embodiments of the present invention provide a method and an apparatus for detecting a ground environment based on a multi-wavelength laser radar. In the method, a laser radar based on different operating wavelengths is used to scan the ground, and a ground environment type is determined based on a reflection intensity feature of the ground environment under different wavelengths of lasers, thereby improving a perception effect on a complex ground environment, and better determining a passable road surface.

According to a first aspect, this application provides a ground environment detection method, including: scanning a ground environment by using laser sounding signals having different operating wavelengths, and receiving a reflected signal that is reflected back by the ground environment for the sounding signal; determining scanning spot information of each scanning spot of the ground environment based on the reflected signal, where the scanning spot information includes a direction angle, a distance and laser reflection intensity of the scanning spot relative to a laser radar; determining space coordinate information and a laser reflection feature of each scanning spot based on each piece of scanning spot information, and partitioning the ground environment into sub-regions having different laser reflection features, where the laser reflection feature includes reflectivity on lasers having different wavelengths; and determining a ground environment type of each sub-region.

It may be understood that, a plurality of laser radars having different operating wavelengths may be used to respectively transmit laser sounding signals of operating wavelengths of the plurality of laser radars to scan the ambient ground environment, or a laser radar having a plurality of operating wavelengths may be used to transmit laser sounding signals having different wavelengths.

In the foregoing method, the ambient ground environment is scanned by using laser sounding signals having different wavelengths, reflectivity of each scanning spot on the lasers having different wavelengths is determined, the ground environment is partitioned into the sub-regions having different laser reflection features, and the ground environment type of each sub-region is determined. The ground environment type is determined based on reflection intensity of the ground environment under different wavelengths, thereby improving a perception effect on a complex ground environment, and better determining a passable road surface.

In a possible implementation, the ground environment type of each sub-region is determined based on a laser reflection feature of each type of ground environment.

In a possible implementation, the laser reflection feature of each sub-region is input into a neural network, to obtain the ground environment type of each sub-region that is output by the neural network. The neural network herein uses a group of data, which uses data of reflectivity of different types of ground environments on the lasers having different wavelengths as an input and a corresponding ground environment type as an output, as a sample data set for training to obtain a data model that is used to distinguish between different types of the ground environment. Based on the data model that is obtained by training by the neural network, the ground environment type of each sub-region is determined for the laser reflection feature of each sub-region, thereby improving accuracy of identification of the ground environment type.

In a possible implementation, location information of each scanning spot is transformed onto a same coordinate system based on the scanning spot information of each scanning spot and an installation position of each laser radar, and the space coordinate information and the laser reflection feature of each scanning spot are determined by fusing the scanning spot information of each scanning spot that is obtained by each laser radar; and region partition is performed based on the space coordinate information and the laser reflection feature of each scanning spot, and the ground environment is partitioned into the sub-regions having different laser reflection features. That is, scanned data of the plurality of laser radars is first fused based on the location information of the scanning spot, then the fused data is clustered based on the reflectivity information of different wavelengths, and the ground environment is partitioned into the sub-regions having different laser reflection features.

In a possible implementation, region partition is separately performed, based on the scanning spot information, on the scanning spots that are obtained by the laser radar, to generate sub-regions after clustering in which each laser radar has different laser reflection intensity; and location information of the sub-regions after clustering of each laser radar is transformed onto a same coordinate system, the scanning spot information of each scanning spot in the sub-region after clustering of each laser radar is fused based on location information of a transformed sub-region, and the ground environment is partitioned into the sub-regions having different laser reflection features. That is, the scanned data of each laser radar is clustered for region partition, then data obtained after region partition is performed on the different laser radars is fused based on the location information, and the ground environment is partitioned into the sub-regions having different laser reflection features.

In a possible implementation, region partition is performed in a region growing manner or a K-means manner.

Further, image data of the ground environment is collected by using a plurality of cameras, and the image data collected by the cameras is processed to identify the ground environment type, and the ground environment type is fused with the ground environment type that is of each sub-region and is determined by a multi-wavelength laser radar, thereby increasing robustness of a ground environment detection system.

According to a second aspect, an embodiment of the present invention provides a ground environment detection device, including: a laser scanning unit, configured to: scan a ground environment by using laser sounding signals having different operating wavelengths, and receive a reflected signal that is reflected back by the ground environment for the sounding signal; a data collection unit, configured to determine scanning spot information of each scanning spot of the ground environment based on the reflected signal, where the scanning spot information includes a direction angle, a distance and laser reflection intensity of the scanning spot relative to a laser radar; a scanned data processing unit, configured to: determine space coordinate information and a laser reflection feature of each scanning spot based on each piece of scanning spot information, and partition the ground environment into sub-regions having different laser reflection features, where the laser reflection feature includes reflectivity on lasers having different wavelengths; and a ground environment determining unit, configured to determine a ground environment type of each sub-region.

In a possible implementation, the laser scanning unit is a mechanical rotating laser radar or a solid-state laser radar.

The ground environment detection device uses the laser sounding signals having different wavelengths to scan the ambient ground environment, determines reflectivity of each scanning spot on the lasers having different wavelengths based on the reflected signal that is reflected by the ground environment, partitions the ground environment into the sub-regions having different laser reflection features, and determines the ground environment type of each sub-region. The ground environment type is determined based on reflection intensity of the ground environment under different laser wavelengths, thereby improving a perception effect on a complex ground environment, and better determining a passable road surface.

In a possible implementation, the ground environment determining unit is configured to determine the ground environment type of each sub-region based on a laser reflection feature of each type of ground environment.

In another possible implementation, the ground environment determining unit is configured to input a laser reflection feature of each sub-region into a neural network, to obtain the ground environment type of each sub-region that is output by the neural network; where a data model that is used by the neural network to distinguish between different types of ground environments is obtained by using a group of data, which uses data of reflectivity of different types of ground environments on the lasers having different wavelengths as an input and the ground environment type as an output, as a sample data set for training.

In a possible implementation, the scanned data processing unit includes: a fusion subunit, configured to: transform location information of each scanning spot onto a same coordinate system based on the scanning spot information of each scanning spot and an installation position of each laser radar, and determine the space coordinate information and the laser reflection feature of each scanning spot by fusing the scanning spot information of each scanning spot that is obtained by each laser radar; and a region partition subunit, configured to perform region partition based on the space coordinate information and the laser reflection feature of each scanning spot, and partition the ground environment into the sub-regions having different laser reflection features. That is, the fusion subunit is configured to first fuse scanned data of a plurality of laser radars based on location information of the scanning spot; and then the region partition subunit is configured to cluster the fused data based on reflectivity information of different wavelengths, and partition the ground environment into the sub-regions having different laser reflection features.

In another possible implementation, the scanned data processing unit includes: a region partition subunit, configured to separately perform region partition, based on the scanning spot information, on the scanning spots that are obtained by the laser radar, to generate sub-regions after clustering in which each laser radar has different laser reflection intensity; and the fusion subunit, configured to transform location information of the sub-regions after clustering of each laser radar onto a same coordinate system, and fuse the scanning spot information of each scanning spot in the sub-region after clustering of each laser radar based on location information of a transformed sub-region, and partition the ground environment into the sub-regions having different laser reflection features. That is, the region partition subunit is configured to cluster the scanned data of each laser radar for region partition; and then the fusion subunit is configured to: fuse data obtained after region partition is performed on the different laser radars based on the location information, and partition the ground environment into the sub-regions having different laser reflection features.

In a possible implementation, the region partition subunit performs region partition in a region growing manner or a K-means manner.

According to third aspect, an embodiment of the present invention provides a ground environment detection device, including: a laser scanning unit, configured to: scan a ground environment by using laser sounding signals having different operating wavelengths, and receive a reflected signal that is reflected back by the ground environment for the sounding signal; and a data processing unit, including a processor and a memory, where the memory is configured to store a computer execution instruction, and the processor is configured to: perform the computer execution instruction, determine scanning spot information of each scanning spot of the ground environment based on the reflected signal, determine space coordinate information and a laser reflection feature of each scanning spot based on each piece of scanning spot information, partition the ground environment into sub-regions having different laser reflection features, and determine a ground environment type of each sub-region, where the scanning spot information includes a direction angle, a distance and laser reflection intensity of the scanning spot relative to a laser radar, and the laser reflection feature includes reflectivity on lasers having different wavelengths.

In a possible implementation, the laser scanning unit is a mechanical rotating laser radar or a solid-state laser radar.

The ground environment detection device uses the laser sounding signals having different wavelengths to scan the ambient ground environment, determines reflectivity of each scanning spot on the lasers having different wavelengths based on the reflected signal that is reflected by the ground environment, partitions the ground environment into the sub-regions having different laser reflection features, and determines the ground environment type of each sub-region. The ground environment type is determined based on reflection intensity of the ground environment under different wavelengths, thereby improving a perception effect on a complex ground environment, and better determining a passable road surface.

In a possible implementation, the processor is configured to determine the ground environment type of each sub-region based on a laser reflection feature of each type of ground environment.

In another possible implementation, the processor is configured to input a laser reflection feature of each sub-region into a neural network, to obtain the ground environment type of each sub-region that is output by the neural network; where a data model that is used by the neural network to distinguish between different types of ground environments is obtained by using a group of data, which uses data of reflectivity of different types of ground environments on the lasers having different wavelengths as an input and the ground environment type as an output, as a sample data set for training.

In a possible implementation, the processor is configured to: transform location information of each scanning spot onto a same coordinate system based on the scanning spot information of each scanning spot and an installation position of each laser radar, determine the space coordinate information and the laser reflection feature of each scanning spot by fusing the scanning spot information of each scanning spot that is obtained by each laser radar, perform region partition based on the space coordinate information and the laser reflection feature of each scanning spot, and partition the ground environment into the sub-regions having different laser reflection features. That is, the processor is configured to: first fuse scanned data of a plurality of laser radars based on the location information of the scanning spot, then cluster the fused data based on the reflectivity information of different wavelengths, and partition the ground environment into the sub-regions having different laser reflection features.

In another possible implementation, the processor is configured to: separately perform region partition, based on the scanning spot information, on the scanning spots that are obtained by the laser radar, to generate sub-regions after clustering in which each laser radar has different laser reflection intensity, transform location information of the sub-regions after clustering of each laser radar onto a same coordinate system, fuse the scanning spot information of each scanning spot in the sub-region after clustering of each laser radar based on location information of a transformed sub-region, and partition the ground environment into the sub-regions having different laser reflection features. That is, the processor is configured to: cluster the scanned data of each laser radar for region partition, and then fuse data obtained after region partition is performed on the different laser radars based on the location information, and partition the ground environment into the sub-regions having different laser reflection features.

In a possible implementation, the processor performs region partition in a region growing manner or a K-means manner.

In foregoing technical solutions, the ground environment detection method and device provided in the embodiments of present invention use the laser sounding signals having different wavelengths to scan the ambient ground environment, partition the ground environment into the sub-regions having different laser reflection features based on the reflectivity of each scanning spot on the lasers having different wavelengths, and determine the ground environment type of each sub-region. The lasers having different wavelengths are used to scan the ground, and the ground environment type is determined based on the reflection intensity feature of the ground environment under different wavelengths of lasers, thereby improving a perception effect of the complex ground environment, and better determining the passable road surface.

BRIEF DESCRIPTION OF DRAWINGS

To describe the technical solutions in embodiments of the present invention more clearly, the following briefly introduces the accompanying drawings required for describing the embodiments. Apparently, the accompanying drawings in the following description show merely some embodiments of the present invention, and a person of ordinary skill in the art may still derive another drawing from these accompanying drawings without creative efforts.

DESCRIPTION OF EMBODIMENTS

The following describes the technical solutions in the embodiments of the present invention with reference to the accompanying drawings in the embodiments of the present invention.

Figure 1:
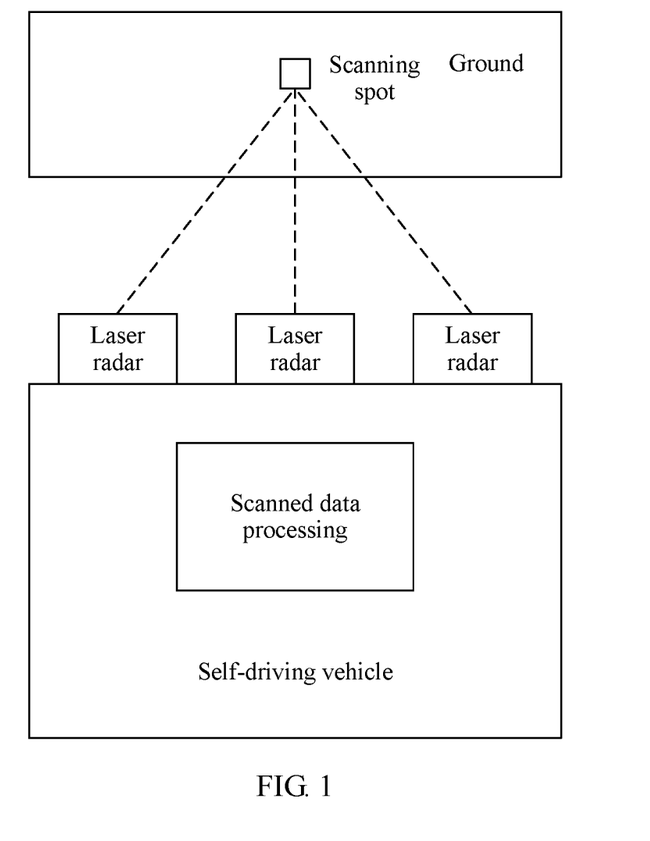
FIG. 1 is a schematic diagram of a ground environment detection scenario to which an embodiment of the present invention is applied.

FIG. 1 is a schematic diagram of a ground environment detection scenario to which an embodiment of the present invention is applied. A whole ground environment detection system includes a laser radar installed on a self-driving car and a scanned data processing unit.

The laser radar may be a mechanical rotating laser radar or a solid-state laser radar, and may be used to transmit a laser signal to a road surface to scan an ambient environment. Each laser radar will receive a laser signal that is reflected by the ground, and return a series of scanning spot information. An existing laser radar mainly uses a 950 nm operating wavelength. However, the laser radar that uses a single operating wavelength is usually difficult to identify a complex road surface environment. In the technical solution of this embodiment of the present invention, a multi-wavelength laser radar is used, that is, a laser radar having different operating wavelengths is used to scan the ground. FIG. 1 shows three laser radars installed on a self-driving vehicle. In actual application, a quantity of installed laser radars may be flexibly selected based on factors such as a requirement and costs. This is not limited in the present invention.

The scanned data processing unit summarizes the information about all the scanning spots that is received by all the laser radars on the ground, and determines a distance and reflection intensity of each scanning spot that returns to the ground based on a time difference between transmitting and receiving of the laser signal and signal information, so as to extract a three-dimensional space structure and reflection intensity of the road surface, and determine whether the road surface is a passable road surface. In this embodiment of the present invention, because lasers having different wavelengths are used for ground scanning, the scanned data processing unit may further partition, based on raw data of the laser radars having different wavelengths, the ground into sub-regions having different laser reflection features, that is, sub-regions in which reflectivity on lasers having different wavelengths are different, and a ground environment type of each sub-region is finally determined.

Figure 2:
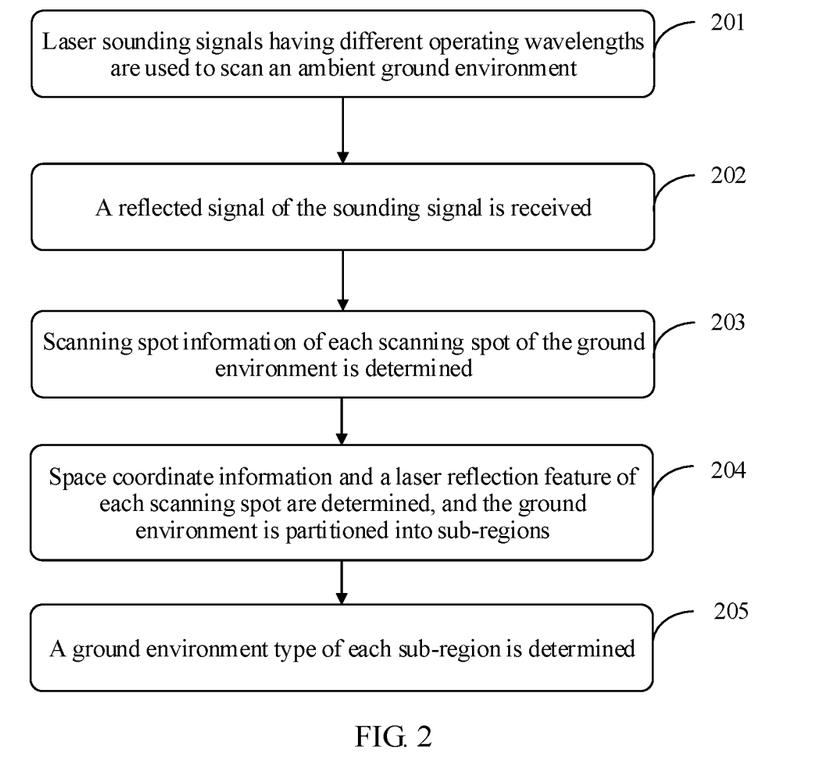
FIG. 2 is a flowchart of a ground environment detection method.

With reference to the schematic diagram of the ground environment detection application scenario shown in FIG. 1, an embodiment of the present invention provides a ground environment detection method. As shown in FIG. 2, a specific process includes the following steps:

Step 201: Laser sounding signals having different operating wavelengths are used to scan a ground environment. A laser radar having different operating wavelengths transmits a laser sounding signal to scan the ambient ground environment. Optionally, a plurality of laser radars may be used to respectively transmit laser sounding signals having different wavelengths, or a plurality of laser radars having different operating wavelengths may be used to respectively transmit laser sounding signals having the operating wavelengths of the plurality of laser radars, or a laser radar having a plurality of operating wavelengths may be used to transmit laser sounding signals having different operating wavelengths.

Step 202: A reflected signal that is reflected back by the ground environment for the sounding signal is received. When the laser sounding signal transmitted by the laser radar meets a target (also referred to as a scanning spot) in the ambient ground environment, the laser sounding signal is reflected, and the laser radar receives a reflected signal that is reflected back from the target.

Step 203: Scanning spot information of a scanning spot is determined based on the received reflected signal, where the scanning spot information herein includes a direction angle, a distance, and laser reflection intensity of the scanning spot relative to the laser radar. Reflected signal information received by each radar may be transmitted to a scanned data processing unit, where a transmission manner herein may be a radio transmission manner (for example, Bluetooth), a cable connection transmission manner (for example, a direct connection of a signal cable), and the like. The scanned data processing unit determines information such as a direction angle, a distance, and laser reflection intensity of each scanning spot based on a transmit signal that is returned by each scanning spot and that is received by each laser radar, such as a time difference between transmitting and receiving of the laser sounding signal and signal intensity information related to transmitting and receiving. Herein, a method for calculating the scanning spot information of the scanning spot by receiving the reflected signal may be an existing common laser radar detection method. This is not described in detail in the present invention, and does not affect the application scope of the present invention.

Step 204: Space coordinate information and a laser reflection feature of each scanning spot are determined based on each piece of scanning spot information, and the ground environment is partitioned into sub-regions having different laser reflection features. The laser reflection feature herein includes reflectivity on lasers having different wavelengths.

Combining scanning spot information of all the scanning spots, that is, based on the direction angle, the distance and the laser reflection intensity of all the scanning spots, the scanned data processing unit fuses scanning spot data that is returned by the laser radar having different operating wavelengths to generate the scanning spot information in a same coordinate system, clusters spots having similar space coordinates and similar laser reflection features in all the scanning spots, and after clustering, partitions the ground environment into the sub-regions having different laser reflection features.

Step 205: A ground environment type of each sub-region is determined.

Optionally, the ground environment type of each sub-region is determined based on a laser reflection feature of each type of ground environment, that is, the reflectivity on the lasers having different wavelengths. In this embodiment, three laser radars having different operating wavelengths are used as examples, and the operating wavelengths are respectively set as $\lambda1$, $\lambda2$, and $\lambda3$. It is assumed that there are three types of ground environments: A, B, C, (which, for example, respectively indicate a road, water, and vegetation), q indicates reflectivity, and a laser reflection feature of each type of ground on the lasers having different wavelengths meets the following relationship:

Type A: $q(\lambda1) \approx q(\lambda2) \approx q(\lambda3)$. Reflectivity on the lasers of the three wavelengths is basically the same.

Type B: $q(\lambda1) \neq q(\lambda2) \approx q(\lambda3) \approx 0$. The reflectivity on the laser whose wavelength is $\lambda1$ is not 0, and the reflectivity on the lasers whose wavelengths are $\lambda2$ and $\lambda3$ is close to 0.

Type C: $q(\lambda1) > q(\lambda2) > q(\lambda3)$. The reflectivity on the lasers whose wavelengths are $\lambda1$, $\lambda2$, $\lambda3$ is reduced one by one.

A type of each sub-region is determined based on the foregoing reflectivity relationship among the lasers having different wavelengths, and a passable road surface is determined. To be specific, a specific type of ground of the sub-region is determined by using the foregoing predefined formula of the laser reflection feature of each type of ground environment.

Optionally, in actual application, if a reflectivity relationship among lasers having different wavelengths is complex, in addition to using the predefined formula shown above, a specific type of ground of the sub-region may be determined by using a machine learning method to extract the laser reflection feature of each sub-region. A group of data, which uses data of reflectivity of different types of ground environments on the lasers having different wavelengths as an input and a corresponding ground environment type as an output, is used as a sample data set, and a data model that is used by a neural network to distinguish between different types of ground environments is obtained by training the neural network. In specific application, the laser reflection feature of each sub-region may be input into the neural network to obtain the ground environment type that is of each sub-region and that is output by the neural network based on the data model. For example, a vector $Q=[q1, q2, \ldots, qN]$ that represents a group of data of reflectivity of a ground environment type on N lasers having different wavelengths is used as an input of the neural network, and $T \in \{T1, T2, \ldots, TM\}$ that represents the ground environment type (including M classifications) is used as an output of the neural network. A series of data in which Q and T are in a one-to-one correspondence is used as the sample data set to train the neural network, so as to obtain the data model that is used by the neural network to distinguish between the types of ground environments. In this way, when a group of laser reflection feature data of each sub-region, that is, reflectivity data of each sub-region on the lasers having different wavelengths is input into the neural network, the neural network may output, based on the data model that is obtained through training, the ground environment type corresponding to each sub-region.

In the ground environment detection method that is provided in an embodiment of the present invention and that is shown in FIG. 2, the laser sounding signals having different wavelengths are used to scan the ambient ground environment, the reflectivity of each scanning spot on the lasers having different wavelengths is determined based on the reflected signal that is reflected by the ground environment, the ground environment is partitioned into the sub-regions having different laser reflection features, and the ground environment type of each sub-region is determined. The lasers having different wavelengths are used to scan the ground, and the ground environment type is determined based on the reflection intensity of the ground environment under different wavelengths of lasers, thereby improving a perception effect of the complex ground environment, and better determining the passable road surface.

Further, in step 204 of the foregoing embodiment, the space coordinate information and the laser reflection feature of each scanning spot are determined based on each piece of scanning spot information, and the ground environment is partitioned into the sub-regions having different laser reflection features. This can be implemented in the following manner: Location information of each scanning spot is transformed onto a same coordinate system based on the scanning spot information of each scanning spot and an installation position of each laser radar, and the space coordinate information and the laser reflection feature of each scanning spot are determined by fusing the scanning spot information of each scanning spot that is obtained by each laser radar, and region partition is performed based on the space coordinate information and the laser reflection feature of each scanning spot, and the ground environment is partitioned into the sub-regions having different laser reflection features. That is, after receiving the scanning spot information from the plurality of laser radars, the scanned data of the plurality of laser radars is first fused based on the location information of the scanning spot, and then the fused data is clustered based on reflectivity information of different wavelengths.

Figure 3A:
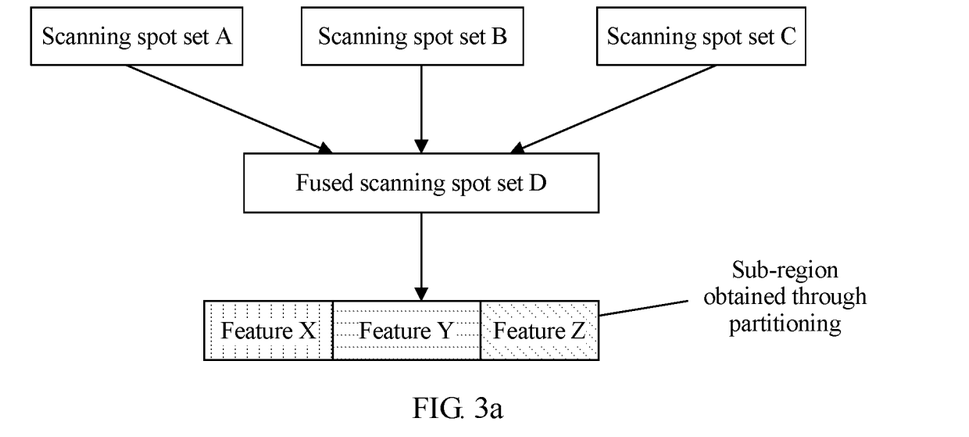
FIG. 3a is a schematic diagram of a method for obtaining a sub-region through partitioning.

Specifically, after receiving the scanning spot information of the plurality of laser radars, the scanned data of the plurality of laser radars is first fused based on the location information (including the direction angle and the distance) of the scanning spot, that is, the scanning spot information of the scanning spots that are scanned by all the laser radars are combined based on the scanning spots. If the installation positions of the plurality of laser radars are different, the locations of the scanning spots that are obtained by each laser radar need to be first transformed onto a same coordinate system, for example, a vehicle coordinate system. After the coordinate transformation is completed, if the location information of the scanning spots that are obtained by each laser radar are not in a one-to-one correspondence but are misplaced, a new scanning spot set needs to be constructed to store scanning information of different laser radars, and a location of each scanning spot in the scanning spot set may select a value based on the location information of the scanning spot of each laser radar, or may select a predefined value. The reflection intensity information (that is, reflectivity information for the lasers having different wavelengths) of different laser radars of each spot in the scanning spot set is determined based on the reflection intensity of the scanning spot of each laser radar, by using nearest matching method or interpolation method, the location of each scanning spot and the reflection intensity for the laser radars having different wavelengths may be finally output, that is, the location information of each scanning spot and the reflectivity information of the scanning spot for the lasers having different wavelengths are finally obtained. For example, it is assumed that N scanning spots are scanned by the three laser radars, and certainly different quantities of scanning spots may be scanned by different laser radars. For ease of description, it is assumed that the quantities of scanning spots scanned by each laser radar are same, and this does not affect the application scope and the protection scope of this embodiment of the present invention. It is assumed that a scanning wavelength of a first laser radar is $\lambda 1$, a scanned scanning spot set A is {P1, P2, . . . , PN}; a scanning wavelength of a second laser radar is $\lambda 2$, and a scanned scanning spot set B is {Q1, Q2, . . . , QN}; scanning wavelength of a third laser radar is $\lambda 3$, and a scanned scanning spot set C is {L1, L2, . . . , LN}; and a scanning spot set D that is newly constructed for fusing is {Z1, Z2, . . . , ZN}; and locations are predetermined as {(x1, y1, z1), (x2, y2, z2), . . . , (xN, yN, zN)}, where 1, 2, . . . , N represent the scanning spots in each scanning spot set, and x, y, z represent the three-dimensional coordinates of the scanning spot. A reflection intensity value of a scanning spot at a nearest location point in {P1, P2, . . . , PN} may be selected as the reflection intensity $q(\lambda 1)$ that is of the Z1 spot and that is corresponding to the first laser radar; a reflection intensity value of a scanning spot at a nearest location point in {Q1, Q2, . . . , QN} may be selected as the reflection intensity $q(\lambda 2)$ that is of the Z1 spot and that is corresponding to the second laser radar; and a reflection intensity value of a scanning spot at a nearest location point in {L1, L2, . . . , LN} may be selected as the reflection intensity $q(\lambda 3)$ that is of the Z1 spot and that is corresponding to the third laser radar. For other scanning spots, similar selections are performed, until the fusion of all the scanning spots in the newly constructed scanning spot set D is completed. After the fusion is completed, region partition is performed on each scanning spot based on features of reflection intensity information of the lasers having different wavelengths of each scanning spot in the fused scanning spot set D (for example, the laser reflection features of the three types of ground environments on the lasers having different wavelengths that are mentioned in the foregoing embodiment), that is, clustering is performed on reflectivity of the lasers having different wavelengths based on the scanning spot. Optionally, the region partition may be performed in a connected domain region growing manner or a K-means (K-means) manner, and the connected domain region growing manner is used herein as an example for description, and does not impose a limitation on the application scope and the protection scope of the embodiment of the present invention. First, a scanning spot is used as a start point, and similarity between the feature of the reflection intensity information of different wavelengths of the adjacent scanning spot and the feature of the reflection intensity information of different wavelengths of the scanning spot is calculated; if the similarity is less than a set threshold, the two scanning spots are considered to be connected and are classified into one category; or if the similarity is not less than a set threshold, the two scanning spots are considered not connected. Then, another adjacent scanning spot continues to be calculated, and so on, until the region partition of all the scanning spots is completed to generate sub-regions having different laser reflection intensity features. The whole processing process is shown in FIG. 3a. The scanning spots that are obtained by scanning by each laser radar are first fused based on the location information, and then region partition is performed based on the location information of each fused scanning spot and the reflection intensity information of the lasers having different wavelengths, to obtain the sub-regions having different laser reflection features.

In a conventional laser radar data processing process, distance information of each location point is usually used for partition. In this embodiment of the present invention, in addition to performing the region partition based on the feature of the reflection intensity information of different wavelengths of each location point, optionally, the region partition may be performed by combining other information in the conventional method, for example, combining the distance information. For example, a position of each scanning spot is indicated by a distance and a scanning angle, and a scanning spot is first selected as a start point, and a distance difference between a scanning spot of the adjacent scanning angle and the scanning spot, and the similarity between the feature of the reflection intensity information of the adjacent scanning spot and the feature of the reflection intensity information of the scanning spot are respectively calculated. If the difference and the similarity are less than their respective thresholds, they are classified into one category.

Optionally, for an implementation of step 204 in the foregoing embodiment, in addition to using the implementation shown in FIG. 3a, the following implementation may also be used: region partition is respectively performed on the scanning spots that are obtained by each laser radar based on the scanning spot information, to generate sub-regions after clustering having different laser reflection intensity, location information of the sub-region after clustering of each laser radar is transformed onto a same coordinate system, the scanning spot information of each scanning spot in each sub-region after clustering of each laser radar is fused based on location information of a transformed sub-region, and the ground environment is partitioned into the sub-regions having different laser reflection features. That is, after receiving the scanning spot information from the plurality of laser radars, the scanned data of each laser radar is first clustered for region partition, and then data obtained after region partition is performed on the different laser radars is fused based on the location information.

Figure 3B:
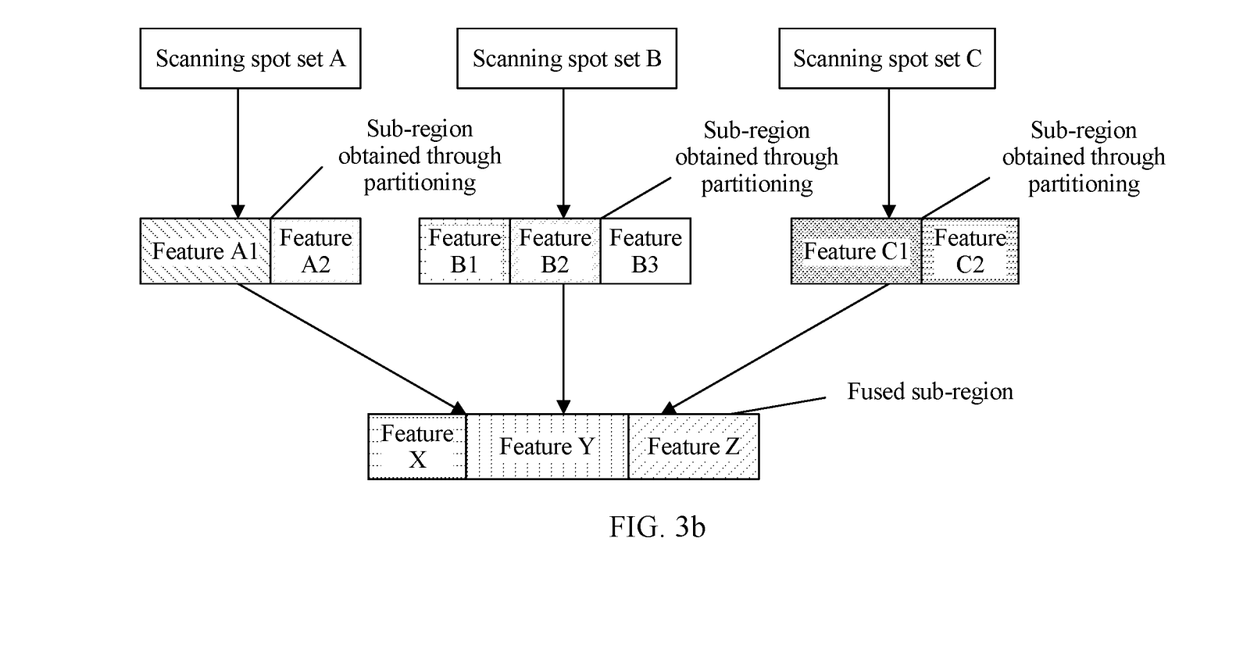
FIG. 3b is another schematic diagram of a method for obtaining a sub-region through partitioning.

Specifically, the scanned data of the plurality of laser radars is first separately clustered based on the reflection intensity information, that is, clustering is performed on reflectivity of the lasers having different wavelengths based on the scanning spot, so as to generate a plurality of sub-regions having similar reflection intensity features. Similar to the method described in the foregoing embodiment, clustering (region partition) may be performed in the connected domain region growing manner or the K-means manner. Similarly, the connected domain region growing manner is used as an example. A scanning spot is first selected as a start point, and then similarity between the reflection intensity information of the adjacent scanning spot and the reflection intensity information of the scanning spot is calculated. If the similarity is less than a set threshold, the two scanning spots are considered connected and classified into one category; or if the similarity is not less than a set threshold, the two scanning spots are considered not connected. Then, another adjacent scanning spot continues to be calculated, and so on, to obtain a sub-region in which each laser radar has a different reflectivity on a wavelength of each laser radar. Similar to the method described in the foregoing embodiment, in addition to performing the region partition based on the feature of reflection intensity information of different wavelengths of each location point, the region partition may be performed by combining other information (such as the distance information) in the conventional method, and the partitioning method and detailed description may also be basically the same as those in the foregoing embodiment. Details are not described herein again. Next, the sub-regions that are obtained through partitioning and that are obtained after the clustering of different laser radars are fused based on the location information of the sub-regions. Similar to the foregoing implementation method, in order to ensure fusion accuracy, the location information of the sub-regions that are generated after the clustering of different laser radars first needs to be fused, and the location information of the sub-regions is transformed onto the same coordinate system. The scanning spot information of each scanning spot in the sub-region after clustering of each laser radar is fused based on the location information of the transformed sub-region, and the ground environment is partitioned into the sub-regions having different laser reflection features. First, in a new coordinate system, a series of new sub-regions are obtained through partitioning based on boundaries of the sub-regions after clustering of all the laser radars, and then reflectivity information of the newly generated sub-region on different wavelength lasers is determined based on the reflection intensity information of the sub-region after clustering of each laser radar. As in the foregoing embodiment, it is also assumed that N scanning spots are scanned by three laser radars, a scanning wavelength of a first laser radar is $\lambda 1$, a scanned scanning spot set A is $\{P1, P2, \ldots, PN\}$, a scanning wavelength of a second laser radar is $\lambda 2$, a scanned scanning spot set B is $\{Q1, Q2, \ldots, QN\}$, a scanning wavelength of a third laser radar is $\lambda 3$, and a scanned scanning spot set C is $\{L1, L2, \ldots, LN\}$. As shown in FIG. 3b, after clustering of the scanning spot set A of the first laser radar, two sub-regions A1 and A2 are generated; after clustering of the scanning spot set B of the second laser radar, three sub-regions B1, B2 and B3 are generated; and after clustering of the scanning spot set C of the third laser radar, two sub-regions C1 and C2 are generated. Finally, fusion is performed based on all the sub-regions A1, A2, B1, B2, B3, C1, and C2: First, the location information of sub-region after clustering of each laser radar is transformed onto the same coordinate system, and three sub-regions X, Y, Z are obtained through partitioning based on the boundaries of all the sub-regions, and the reflection strength information of each sub-region on different wavelengths is determined based on the fusion of the wavelength information of the laser radar corresponding to each sub-region, and the ground environment is partitioned into the sub-regions X, Y, and Z having different laser reflection features.

Further, a ground environment detection method used in this embodiment of the present invention is combined with a conventional method. For example, image data of the ambient ground environment may be collected by using a plurality of cameras, and in addition to the fusion of data that is scanned by each laser radar having the plurality of wavelengths, processing and fusion of the image data collected by the cameras is added. For example, image data collected by the cameras is processed to identify the ground environment type, and the ground environment type is further determined by comparing the identified ground environment type with the ground environment type of each sub-region that is determined by laser radar having the plurality of wavelengths, thereby increasing robustness of the ground environment detection system.

Figure 4:
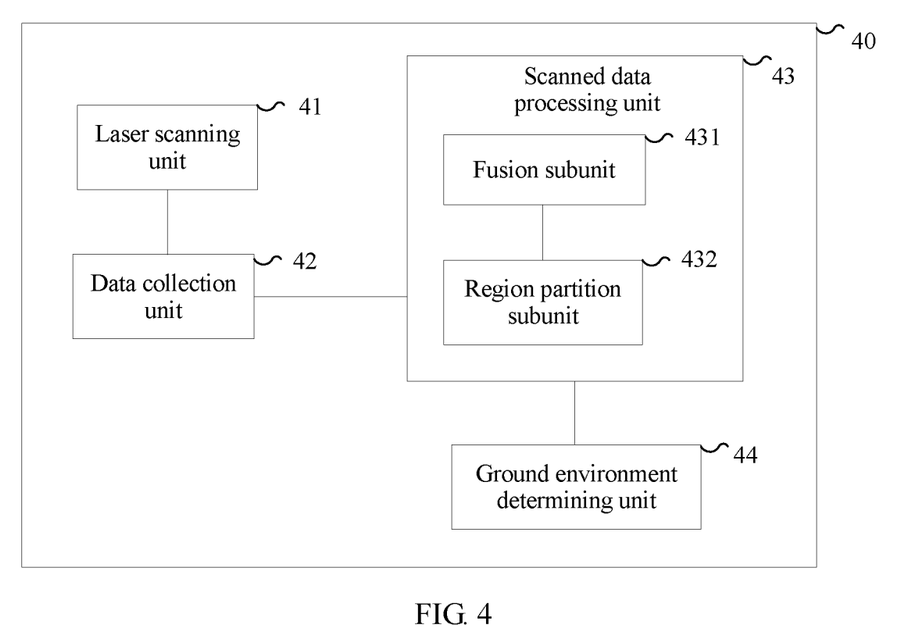
FIG. 4 is a schematic structural diagram of a ground environment detection device.

The foregoing has described in detail the ground environment detection method provided in this embodiment of the present invention with reference to FIG. 1, FIG. 2, FIG. 3a, and FIG. 3b. FIG. 4 is a possible schematic structural diagram of a ground environment detection device used in this application. The detection device may implement a function of the ground environment detection device in the method embodiment in FIG. 2. For terms and implementation details that are not defined in this embodiment, refer to the foregoing method embodiment in FIG. 2. As shown in FIG. 4, a ground environment detection device 40 includes a laser scanning unit 41, a data collection unit 42, a scanned data processing unit 43, and a ground environment determining unit 44. The laser scanning unit 41 is configured to: scan an ambient ground environment by using laser sounding signals having different operating wavelengths, and receive a reflected signal that is reflected back by the ground environment for the sounding signal. The data collection unit 42 is configured to determine scanning spot information of each scanning spot in the ground environment based on the reflected signal that is received by the laser scanning unit 41, where the scanning spot information includes a direction angle, a distance and laser reflection intensity of the scanning spot relative to a laser radar. The scanned data processing unit 43 is configured to: determine space coordinate information and laser reflection feature of each scanning spot based on each piece of scanning spot information, and partition the ground environment into sub-regions having different laser reflection features, where the laser reflection feature herein includes reflectivity on lasers having different wavelengths. The ground environment determining unit 44 is configured to determine a ground environment type of each sub-region.

Optionally, the laser scanning unit 41 may be a mechanical rotating laser radar or a solid-state laser radar. The laser scanning unit 41 may be a plurality of laser radars having different operating wavelengths or a laser radar having a plurality of operating wavelengths.

The ground environment detection device provided in this embodiment uses the laser sounding signals having different wavelengths to scan the ambient ground environment, determines the reflectivity of each scanning spot on the lasers having different wavelengths based on the reflected signal that is reflected by the ground environment, partitions the ground environment into the sub-regions having different laser reflection features, and determines the ground environment type of each sub-region. The lasers having different wavelengths are used to scan the ground, and the ground environment type is determined based on the laser reflection intensity of the ground environment under different wavelengths of lasers, thereby improving a perception effect of the complex ground environment, and better determining a passable road surface.

Optionally, the ground environment determining unit 44 is specifically configured to determine the ground environment type of each sub-region based on a laser reflection feature of each type of ground environment. The laser reflection feature of each type of ground environment herein may be represented by using a predefined formula.

Optionally, the ground environment determining unit 44 is specifically configured to input laser reflection feature of each sub-region into a neural network, to obtain the ground environment type of each sub-region that is output by the neural network. The neural network herein uses a group of data, which uses data of reflectivity of different types of ground environments on the lasers having different wavelengths as an input and the ground environment type as an output, as a sample data set for training to obtain a data model that is used to distinguish between different types of ground environments, and the neural network uses the data model to input the laser reflection feature of each sub-region into the ground environment determining unit 44 to output the ground environment type of each sub-region.

Further, as shown in FIG. 4, the scanned data processing unit 43 includes a fusion subunit 431 and a region partition subunit 432. The fusion subunit 431 is configured to: transform location information of each scanning spot onto a same coordinate system based on the scanning spot information of each scanning spot and an installation position of each laser radar, and determine the space coordinate information and the laser reflection feature of each scanning spot by fusing the scanning spot information of each scanning spot that is obtained by each laser radar. The region partition subunit 432 is configured to: perform region partition based on the space coordinate information and the laser reflection feature of each scanning spot, and partition the ground environment into the sub-regions having different laser reflection features. That is, the fusion subunit 431 first fuses the scanning spots that are obtained by scanning by each laser radar based on the location information, and then the region partition subunit 432 performs region partition based on the location information of each fused scanning spot and the reflection intensity information on the lasers having different wavelengths, so as to obtain sub-regions having different laser reflection features. The fusion of the scanning spots that are obtained by scanning by each laser radar based on the location information, and the method and detailed description of performing region partition based on the fused scanning spot are basically the same as the descriptions of the implementation that is used in step 204 and that is shown in FIG. 3a in the foregoing method embodiment. Details are not described herein again.

Optionally, the scanned data processing unit 43 includes the fusion subunit 431 and the region partition subunit 432. The region partition subunit 432 is configured to separately perform region partition, based on the scanning spot information, on the scanning spots that are obtained by the laser radar, to generate sub-regions after clustering in which each laser radar has different laser reflection intensity. The fusion subunit 431 is configured to: transform location information of the sub-regions after clustering of each laser radar onto a same coordinate system, fuse the scanning spot information of each scanning spot in the sub-region after clustering of each laser radar based on location information of a transformed sub-region, and partition the ground environment into the sub-regions having different laser reflection features. That is, after receiving the scanning spot information from a plurality of laser radars, the region partition subunit 432 first separately clusters scanned data of each laser radar for partition, and then the fusion subunit 431 fuses, based on the location information, data of the sub-regions that are obtained through partitioning and that are of the different laser radars, and partitions the ground environment into the sub-regions having different laser reflection features. The related method and detailed description of separately clustering and partitioning the scanned data of each laser radar into the sub-regions and fusing, based on the location information, the data of the sub-regions that are obtained through partitioning are basically the same as the descriptions of the implementation that is used in step 204 and that is shown in FIG. 3b in the foregoing method embodiment. Details are not described herein again.

Optionally, the region partition subunit 432 performs region partition in a region growing manner or a K-means manner.

Figure 5:
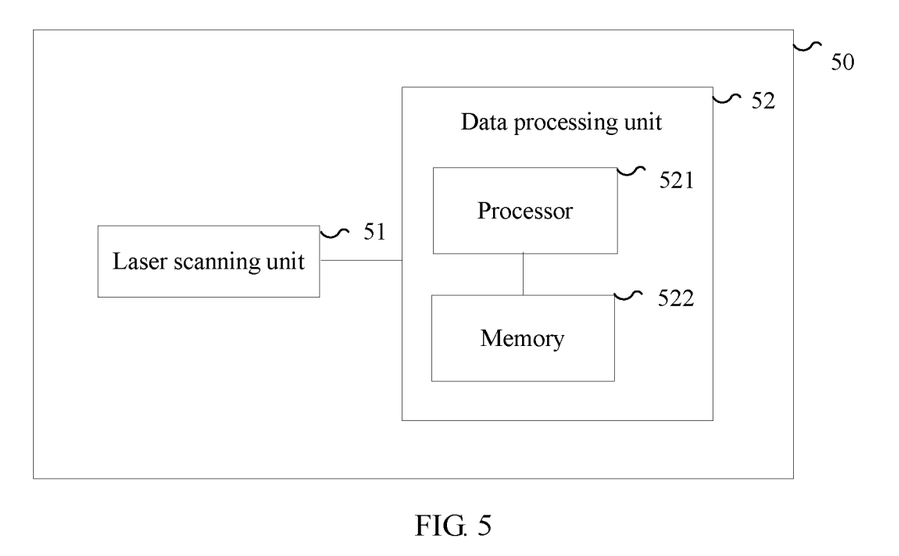
FIG. 5 is another schematic structural diagram of a ground environment detection device.

FIG. 5 schematically shows another ground environment detection device 50 according to an embodiment of the present invention. As shown in FIG. 5, the ground environment detection device 50 includes a laser scanning unit 51 and a data processing unit 52. The laser scanning unit 51 is configured to: scan an ambient ground environment by using laser sounding signals having different operating wavelengths, and receive a reflected signal that is reflected back by the ground environment for the sounding signal. The data processing unit 52 includes a processor 521 and a memory 522. The memory 522 is configured to store a computer execution instruction. The processor 521 performs the computer execution instruction stored in the memory 522, and is configured to: determine scanning spot information of each scanning spot of the ground environment based on the reflected signal, determine space coordinate information and a laser reflection feature of each scanning spot based on each piece of scanning spot information, partition the ground environment into sub-regions having different laser reflection features, and determine a ground environment type of each sub-region. The scanning spot information herein includes a direction angle, a distance, and laser reflection intensity of the scanning spot relative to a laser radar, and the laser reflection feature includes reflectivity on lasers having different wavelengths.

The processor 521 may use a central processing unit (CPU), a microprocessor, an application-specific integrated circuit (ASIC), or one or more integrated circuits to execute a related program, so as to implement the technical solution provided in this embodiment of the present invention.

The memory 522 may be a read-only memory (ROM), a static storage device, a dynamic storage device, or a random access memory (RAM). When the technical solutions provided in this embodiment of the present invention are implemented by using software or firmware, program code for implementing the technical solutions provided in this embodiment of the present invention is stored in the memory 522, and is executed by the processor 521.

Specifically, the memory 522 may be configured to store the computer execution instruction, or may be configured to store various information, for example, a laser reflection feature formula of each type of ground environment. The processor 521 may read the information that is stored in the memory 522, or store the collected information into the memory 522.

Optionally, the processor 521 is configured to determine the ground environment type of each sub-region based on a laser reflection feature of each type of ground environment.

Optionally, the processor 521 is configured to input a laser reflection feature of each sub-region into a neural network, to obtain the ground environment type of each sub-region that is output by the neural network; where a data model that is used by the neural network to distinguish between different types of ground environments is obtained by using a group of data, which uses data of reflectivity of different types of ground environments on the lasers having different wavelengths as an input and the ground environment type as an output, as a sample data set for training.

Optionally, the processor 521 is configured to: transform location information of each scanning spot onto a same coordinate system based on the scanning spot information of each scanning spot and an installation position of each laser radar, determine the space coordinate information and the laser reflection feature of each scanning spot by fusing the scanning spot information of each scanning spot that is obtained by each laser radar, perform region partition based on the space coordinate information and the laser reflection feature of each scanning spot, and partition the ground environment into the sub-regions having different laser reflection features.

Optionally, the processor 521 is configured to: separately perform region partition, based on the scanning spot information, on the scanning spots that are obtained by the laser radar, to generate sub-regions after clustering in which each laser radar has different laser reflection intensity, transform location information of the sub-regions after clustering of each laser radar onto a same coordinate system, fuse the scanning spot information of each scanning spot in the sub-region after clustering of each laser radar based on location information of a transformed sub-region, and partition the ground environment into the sub-regions having different laser reflection features.

Certainly, the processor 521 may also perform region partition in a region growing manner or a K-means manner.

It should be noted that, although only the processor 521 and the memory 522 are shown for the data processing unit in FIG. 5, in a specific implementation process, a person skilled in the art should understand that the data processing unit further includes another device required for implementing normal running. For example, a communications interface and a bus, where the communications interface may use a transceiver apparatus, for example, but is not limited to, a transceiver, to implement communication between the data processing unit 52 and the laser scanning unit 51. The bus may include a channel for transmitting information between the processor 521 and the memory 522. The bus may be a peripheral component interconnect (PCI) bus, an extended industry standard architecture (EISA) bus, or the like. The bus may be categorized as an address bus, a data bus, a control bus, or the like. For ease of presentation, a person skilled in the art should understand that, according to a specific requirement, the ground environment detection device 50 shown in FIG. 5 may further include a hardware device that implements another additional function.

A person of ordinary skill in the art may be aware that, in combination with the examples described in the embodiments disclosed in this specification, method steps and units may be implemented by electronic hardware, computer software, or a combination thereof. To clearly describe interchangeability between the hardware and the software, the foregoing has generally described steps and compositions of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing apparatus and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit/module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

If the integrated unit is implemented in the form of a software function unit and sold or used as an independent product, the integrated unit may be stored in a computer-readable storage medium or transmitted as one or more instructions or codes in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium. Based on such an understanding, the technical solutions of the present invention essentially, or the part contributing to the prior art, or all or some of the technical solutions may be stored in a storage medium and includes several instructions for instructing a computer device (which may be a personal computer, a server, a network device, or the like) to perform all or some of the steps of the methods described in the embodiments of the present invention.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions in the embodiments of the present invention.

What is claimed is:

1. A ground environment detection method, comprising:
   scanning a ground environment by using laser sounding signals having different operating wavelengths;
   receiving a reflected signal that is reflected back by the ground environment for the sounding signal;
   determining scanning spot information of each scanning spot of the ground environment based on the reflected signal, wherein the scanning spot information comprises a direction angle, a distance, and laser reflection intensity of the scanning spot relative to a laser radar;
   determining space coordinate information and a laser reflection feature of each scanning spot based on each piece of scanning spot information;
   partitioning the ground environment into sub-regions having different laser reflection features, wherein the laser reflection feature comprises reflectivity on lasers having different wavelengths; and
   determining a ground environment type of each sub-region.

2. The method according to claim 1, wherein the determining a ground environment type of each sub-region comprises:
   determining the ground environment type of each sub-region based on a laser reflection feature of each type of ground environment.

3. The method according to claim 1, wherein the determining a ground environment type of each sub-region comprises:
   inputting a laser reflection feature of each sub-region into a neural network to obtain the ground environment type of each sub-region that is output by the neural network, wherein a data model that is used by the neural network to distinguish between different types of ground environments is obtained by using a group of data, which uses data of reflectivity of different ground environments on the lasers having different wavelengths as an input and the ground environment type as an output as a sample data set for training.

4. The method according to claim 1, wherein the determining space coordinate information and a laser reflection feature of each scanning spot based on each piece of scanning spot information, and the partitioning the ground environment into sub-regions having different laser reflection features comprises:
   transforming location information of each scanning spot onto a same coordinate system based on the scanning spot information of each scanning spot and an installation position of each laser radar;
   determining the space coordinate information and the laser reflection feature of each scanning spot by fusing the scanning spot information of each scanning spot that is obtained by each laser radar; and performing region partition based on the space coordinate information and the laser reflection feature of each scanning spot to partition the ground environment into the sub-regions having different laser reflection features.

5. The method according to claim 1, wherein the determining space coordinate information and a laser reflection feature of each scanning spot based on each piece of scanning spot information, and the partitioning the ground environment into sub-regions having different laser reflection features comprises:

separately performing region partition, based on the scanning spot information, on the scanning spot that is obtained by each laser radar, to generate sub-regions after clustering in which each laser radar has different laser reflection intensity;

transforming location information of the sub-region after clustering of each laser radar onto a same coordinate system;

fusing scanning spot information of each scanning spot in the sub-region after clustering of each laser radar based on location information of a transformed sub-region; and partitioning the ground environment into the sub-regions having different laser reflection features.

6. The method according to claim 4, wherein region partition is performed in a region growing manner or a K-means manner.

7. A ground environment detection device, comprising:
a laser radar, the laser radar configured to:
  scan a ground environment by using laser sounding signals having different operating wavelengths; and
  receive a reflected signal that is reflected back by the ground environment for the sounding signal;
at least one processor;
a non-transitory computer-readable storage medium coupled to the processor and storing programming instructions for execution by the processor, the programming instructions instruct the at least one processor to:
  determine scanning spot information of each scanning spot of the ground environment based on the reflected signal, wherein the scanning spot information comprises a direction angle, a distance, and laser reflection intensity of the scanning spot relative to a laser radar;
  determine space coordinate information and a laser reflection feature of each scanning spot based on each piece of scanning spot information, and partition the ground environment into sub-regions having different laser reflection features, wherein the laser reflection feature comprises reflectivity on lasers having different wavelengths; and
  determine a ground environment type of each sub-region.

8. The detection device according to claim 7, wherein the instructions instruct the at least one processor to:
determine the ground environment type of each sub-region based on a laser reflection feature of each type of ground environment.

9. The detection device according to claim 7, wherein instructions instruct the at least one processor to:
input a laser reflection feature of each sub-region into a neural network to obtain the ground environment type of each sub-region that is output by the neural network, wherein a data model that is used by the neural network to distinguish between different types of ground environments is obtained by using a group of data, which uses data of reflectivity of different ground environments on the lasers having different wavelengths as an input and the ground environment type as an output, as a sample data set for training.

10. The detection device according to claim 7, wherein the instructions instruct the at least one processor to:
transform location information of each scanning spot onto a same coordinate system based on the scanning spot information of each scanning spot and an installation position of each laser radar;
determine the space coordinate information and the laser reflection feature of each scanning spot by fusing the scanning spot information of each scanning spot that is obtained by each laser radar; and
perform region partition based on the space coordinate information and the laser reflection feature of each scanning spot to partition the ground environment into the sub-regions having different laser reflection features.

11. The detection device according to claim 7, wherein the instructions instruct the at least one processor to:
separately perform region partition, based on the scanning spot information, on the scanning spot that is obtained by each laser radar, to generate sub-regions after clustering in which each laser radar has different laser reflection intensity;
transform location information of the sub-region after clustering of each laser radar onto a same coordinate system
fuse scanning spot information of each scanning spot in the sub-region after clustering of each laser radar based on location information of a transformed sub-region; and
partition the ground environment into the sub-regions having different laser reflection features.

12. The detection device according to claim 10, wherein the instructions instruct the at least one processor to perform region partition in a region growing manner or a K-means manner.

13. A ground environment detection device, comprising:
a laser scanning unit, the laser scanning unit configured to: scan a ground environment by using laser sounding signals having different operating wavelengths, and receive a reflected signal that is reflected back by the ground environment for the sounding signal; and
a data processing unit, comprising at least one processor and a memory, wherein the memory is configured to store a computer execution instruction, and the at least one processor performs the computer execution instruction and is configured to:
  determine scanning spot information of each scanning spot of the ground environment based on the reflected signal;
  determine space coordinate information and a laser reflection feature of each scanning spot based on each piece of scanning spot information;
  partition the ground environment into sub-regions having different laser reflection features; and
  determine a ground environment type of each sub-region, wherein the scanning spot information comprises a direction angle, a distance, and laser reflection intensity of the scanning spot relative to the laser scanning unit, and wherein the laser reflection feature comprises reflectivity on lasers having different wavelengths.

14. The detection device according to claim 13, wherein the at least one processor is configured to:
   determine the ground environment type of each sub-region based on a laser reflection feature of each type of ground environment.

15. The detection device according to claim 13, wherein the at least one processor is configured to:
   input a laser reflection feature of each sub-region into a neural network to obtain the ground environment type of each sub-region that is output by the neural network, wherein a data model that is used by the neural network to distinguish between different types of ground environments is obtained by using a group of data, which uses data of reflectivity of different ground environments on the lasers having different wavelengths as an input and the ground environment type as an output, as a sample data set for training.

16. The detection device according to claim 13, wherein the at least one processor is configured to:
   transform location information of each scanning spot onto a same coordinate system based on the scanning spot information of each scanning spot and an installation position of each laser radar;
   determine the space coordinate information and the laser reflection feature of each scanning spot by fusing the scanning spot information of each scanning spot that is obtained by each laser radar; and
   perform region partition based on the space coordinate information and the laser reflection feature of each scanning spot to partition the ground environment into the sub-regions having different laser reflection features.

17. The detection device according to claim 13, wherein the at least one processor is configured to:
   separately perform region partition, based on the scanning spot information, on the scanning spot that is obtained by each laser radar, to generate sub-regions after clustering in which each laser radar has different laser reflection intensity;
   transform location information of the sub-region after clustering of each laser radar onto a same coordinate system;
   fuse scanning spot information of each scanning spot in the sub-region after clustering of each laser radar based on location information of a transformed sub-region; and
   partition the ground environment into the sub-regions having different laser reflection features.

18. The detection device according to claim 16, wherein the at least one processor performs region partition in a region growing manner or a K-means manner.

* * * * *